(12) United States Patent
Chang

(10) Patent No.: US 9,263,171 B2
(45) Date of Patent: Feb. 16, 2016

(54) CONDUCTIVE MASTERBATCHES AND CONDUCTIVE MONOFILAMENTS

(75) Inventor: Sheng-Shan Chang, Taipei County (TW)

(73) Assignee: Taiwan Textile Research Institute, Tucheng, Taipei County (TW)

( * ) Notice: Subject to any disclaimer, the term of this patent is extended or adjusted under 35 U.S.C. 154(b) by 909 days.

(21) Appl. No.: 13/372,676

(22) Filed: Feb. 14, 2012

(65) Prior Publication Data

US 2012/0141762 A1 Jun. 7, 2012

Related U.S. Application Data

(62) Division of application No. 12/346,104, filed on Dec. 30, 2008, now Pat. No. 8,216,492.

(30) Foreign Application Priority Data

Dec. 8, 2008 (TW) .............................. 97147579 A

(51) Int. Cl.

| | |
|---|---|
| *H01B 1/06* | (2006.01) |
| *C04B 35/00* | (2006.01) |
| *A01K 1/015* | (2006.01) |
| *B32B 9/00* | (2006.01) |
| *H01B 1/24* | (2006.01) |
| *C08J 3/22* | (2006.01) |
| *C08L 67/02* | (2006.01) |
| *D01F 1/09* | (2006.01) |
| *D01F 6/62* | (2006.01) |
| *D04H 3/007* | (2012.01) |
| *C08K 3/04* | (2006.01) |
| *C08K 5/29* | (2006.01) |
| *C08K 5/353* | (2006.01) |
| *C08L 23/08* | (2006.01) |

(52) U.S. Cl.
CPC . *H01B 1/24* (2013.01); *C08J 3/226* (2013.01); *C08L 67/02* (2013.01); *D01F 1/09* (2013.01); *D01F 6/62* (2013.01); *D04H 3/007* (2013.01); *C08J 2467/02* (2013.01); *C08K 3/04* (2013.01); *C08K 5/29* (2013.01); *C08K 5/353* (2013.01); *C08K 2201/011* (2013.01); *C08L 23/0876* (2013.01); *Y10T 428/249921* (2015.04); *Y10T 428/292* (2015.01); *Y10T 428/2918* (2015.01)

(58) Field of Classification Search
None
See application file for complete search history.

(56) References Cited

U.S. PATENT DOCUMENTS

| | | | |
|---|---|---|---|
| 7,008,991 B2 * | 3/2006 | Takagi et al. ................. | 524/496 |
| 2008/0139065 A1 * | 6/2008 | Amarasekera et al. ....... | 442/189 |
| 2008/0191176 A1 * | 8/2008 | Tobori et al. .................. | 252/511 |
| 2008/0214699 A1 * | 9/2008 | Halahmi et al. .............. | 523/222 |
| 2011/0204298 A1 * | 8/2011 | Chang et al. .................. | 252/508 |

FOREIGN PATENT DOCUMENTS

WO  WO 2009020261 A1 *  2/2009 ............. C08L 67/02

OTHER PUBLICATIONS

Ash et al., "Handbook of Plastic and Rubber Additives," 2nd ed., p. 1280 (2005).*

* cited by examiner

*Primary Examiner* — Mark Kopec
*Assistant Examiner* — Jaison Thomas
(74) *Attorney, Agent, or Firm* — Rosenberg, Klein & Lee

(57) ABSTRACT

The present invention relates to a polyester matrix powder comprising a polybutylene terephthalate, a homogeneously dispersed carbon nanotube powder, a dispersant and a chain extender; to a conductive masterbatch with homogeneous and smooth surface; to a process for the preparation of the conductive masterbatch; to a conductive monofilament prepared from the conductive masterbatch; to a process for the preparation of the conductive monofilament; and to a fabric article prepared from the monofilament. The present invention is characterized in the preparation of carbon nanotube-containing fiber materials with higher conductivity and the improvement of the spinning property of the conductive masterbatches to avoid blocking and yarn breakage during the spinning process.

33 Claims, No Drawings

CONDUCTIVE MASTERBATCHES AND CONDUCTIVE MONOFILAMENTS

RELATED APPLICATIONS

This application is a Divisional patent application of co-pending application Ser. No. 12/346,104, filed on 30 Dec. 2008, now pending. The entire disclosure of the prior application Ser. No. 12/346,104, from which an oath or declaration is supplied, is considered a part of the disclosure of the accompanying Divisional application and is hereby incorporated by reference.

BACKGROUND OF THE INVENTION

1. Field of the Invention

The present invention relates to polyester matrix powders containing carbon nanotube powders dispersed therein; to conductive masterbatches with homogeneous and smooth surfaces and the preparing process thereof; to conductive monofilaments formed from the said conductive masterbatches and the preparing process thereof; and to textiles prepared from the said conductive monofilaments.

2. Description of Related Arts

Carbon nanotubes have been known as graphitizing carbon tubes and are different from conventional carbons in that the carbon nanotubes have a specific character of L/D ratio and can be used as the best conductive materials. Generally, the larger the L/D ratio of carbon nanotubes is, the better the conductivity of the same is. However, if the L/D ratio is too large, problems occur during spinning process. For instance, if the arrangement or orientation of the carbon nanotubes is not good, the drawing process becomes difficult. Further, if the carbon nanotubes fail to pass the fiber filter test, the filaments formed therefrom easily break during spinning process.

In order to enhance the conductivity of polymer matrixes, carbon nanotubes having good dispersibility may be added. The carbon nanotubes are obtainable by a high-speed mechanic force, followed by uniformly dispersing the carbon nanotubes in the polymer matrixes. However, achieving the dispersing effect and enhancing the conductivity of the polymer matrixes via such a high-speed mechanic process are only effective when the concentration of carbon nanotubes is low. If the concentration of the carbon nanotubes is high, the uniform dispersing effect cannot be reached even though the conductivity is increased. On the other side, the longer the carbon nanotubes is, the better the increasing effect of their conductivity is. Nevertheless, if the long length of the carbon nanotubes is disadvantageous to the processability. Such a result is caused by the tanglement of the carbon nanotubes themselves.

Recently, the high-speed shear mixing and processing technology makes the addition of up to 15 wt. % of the carbon nanotubes in the polymer matrix possible. However, the carbon nanotubes have poor dispersibility in the polymer materials by their process.

In other conventional methods, carbon nanotubes are dispersed in a strong acid solution to shatter the aggregates of the carbon nanotubes via ultrasonic wave. Specifically, the aggregates may be shattered in a mixed acid solution containing $H_2SO_4$ and $HNO_3$ in a ratio of 3:1 at 50° C. via ultrasonic wave over a time period of 24 hours. The carbon nanotubes treated by a strong acid solution are easy to produce a COOH group that may increase the dispersibility of carbon nanotubes. However, this method has disadvantages in that the carbon nanotubes treated by a strong acid solution cause defects on the surfaces of their structures, and thus the properties and functions of the carbon nanotubes will be greatly reduced.

The prior art, for instance, CN1475437A discloses a process for the preparation of a carbon nanotube paper, comprising the steps of: purifying carbon nanotubes, dispersing the carbon nanotubes and forming a carbon nanotube paper; wherein the carbon nanotubes are repeatedly treated until the impurities are removed and the carbon nanotubes are sufficiently dispersed. Such processes have several disadvantages, such as: 1) the procedure is very complicated and costly; 2) the surfaces of carbon nanotubes treated with a strong acid will be destroyed and the properties, such as antistatic ability, conductivity or strength, of the carbon nanotubes become poor; 3) it is difficult to disperse the carbon nanotubes in a solvent and the solvent used causes an environmental problem; and 4) the surfaces of the carbon nanotubes are destroyed due to the treatment with a strong acid and the yield is only about 30 to 60%, whereby the production cost of the carbon nanotubes is significantly increased.

CN1563526A discloses conductive fibers containing carbon nanotubes and the preparing process thereof. The conductive fibers comprise 80 to 99.9 wt. % of a polyester, 0.05 to 10 wt. % of carbon nanotubes and 0.05 to 10 wt. % of a coupling agent, wherein the coupling agent is selected from OP wax, montan wax, polyethylene vinyl acetate or aluminate. In this known technology, the carbon nanotubes are untangled under a strong shear force, thereby being homogeneously dispersed within the polyester matrix. In this process, only a lower content of carbon nanotubes is required for preparing conductive fibers. According to this process, the coupling agent is added after the polyester and carbon nanotubes are dried under vacuum, followed by mixing them at a high speed and at a temperature of 70 to 120° C. After that, masterbatches are prepared at a speed of 40 to 150 rpm by using a twin-screw mixer. According to this process, it is difficult to untangle the carbon nanotubes due to the long length L (=100 μm) of carbon nanotubes, as shown in the examples of this China application. Thus, filaments formed from the said carbon nanotubes fail to pass the filter test and possibly break during spinning process. Furthermore, due to the coupling agent and low content of the carbon nanotubes, the increase of the conductivity of the filaments formed according to such a process is limited. In addition, the carbon nanotubes are drawn out during the vacuum dryness procedure for the polyester and carbon nanotubes, and the conductivity of the carbon nanotubes is reduced because of the low content of carbon nanotubes. The masterbatches from the carbon nanotubes prepared by this process exhibit poor physical properties. It is necessary to use bi-component composite spinning method to produce filaments. Moreover, the conductivity of the filaments is lowered and the textiles prepared therefrom merely exhibit an antistatic effect and have a surface resistance of $1.2 \times 10^6$ Ω/sq.

Further, CN1584141A discloses conductive composite fibers colored with original liquid by composite spinning process, characterized in that the fibers are composed of a core layer and a sheath layer, wherein the core layer is a polyester containing 2 to 60% of conductive components selected from a conductive carbon black, a carbon nanotube, a nano-graphite or conductive metal oxides, which has a surface resistance of less than $10^6$ Ω·cm. The process of this China application comprises dispersing the conductive particles by melt-state mixing. The masterbatches formed from the carbon nanotube according to this process have unstable physical properties. Thus, it is necessary to use a bi-component spinning procedure to enhance the mechanical properties of fibers.

CN1869291A discloses a fiber structure of nano compound material containing a polyester and a carbon nanotube, wherein the polyester and carbon nanotube are dispersed in a solvent to form a stable dispersion containing polyester/carbon nanotube, and then a fiber structure of nano compound material containing a polyester and a carbon nanotube, such as the structures of a fiber and a non-woven fabric or film formed therefrom is prepared by electrostatic spinning. The formed fiber or non-woven fabric or film has a conductivity of $10^{-17}$ to $10^2$ S/cm. In this process, the carbon nanotube is dispersed in the polyester by ultrasonic or mechanical or electromagnetic stirring step.

U.S. Pat. No. 7,094,467B2 discloses an antistatic polymer monofilament and the preparing process thereof. The antistatic polymer monofilament comprises a polymer composite of a thermoplastic polymer as a matrix and carbon nanotubes as a conductive filler. The textiles formed from the monofilament have a surface resistance of $10^4$ to $10^9$ ω/sq. However, the textiles only exhibit an antistatic effect and haves a surface resistance of $2 \times 10^7$ ω/sq.

In the conventional technology, carbon nanotubes is generally added in the polymer in an amount of 2 wt. % or less. Such an amount of the carbon nanotubes limits the increase of the conductivity. It is known that the dispersibility of the carbon nanotubes is poor and may result in breakage, brittleness and difficulties in granulating the polymer matrix when the carbon nanotubes in the polyester matrix are in an amount of 5 wt. % or more. The problems and disadvantages stated above may be solved by the addition of a dispersant and a chain extender.

Accordingly, in order to obtain conductive monofilaments containing a low content of carbon nanotubes and having good conductivity and excellent spinning processability as well as to avoid the above-mentioned disadvantages and problems, the present invention provides novel conductive polyester materials, which comprises polyester matrix powders containing a homogeneously dispersed carbon nanotube, a dispersants and a chain extender.

SUMMARY OF THE INVENTION

The object of the present invention is to provide polyester matrix powders containing carbon nanotube powders dispersed therein and having excellent electrical conductivity, the applications of conductive masterbatches, conductive monofilamens and textiles, and the processes for preparation of the same.

DETAILED DESCRIPTION OF THE INVENTION

The present invention provides a polyester matrix powder containing carbon nanotube powders homogeneously dispersed therein, wherein the polyester matrix powder comprises:
A) a polyester polymeric matrix based on polybutylene terephthalate(PBT) or the copolymers thereof,
B) carbon nanotube powders which have been milled at a ultrahigh speed,
C) a dispersant, and
D) a chain extender,
wherein the above components A), B), C) and D) are mixed in a high-speed powder mixer, to obtain a polyester matrix powder.

For component A) of the present invention, polybutylene terephthalate or the copolymer thereof is selected from the group consisting of polybutylene terephthalate homopolymer, copolyester containing butylene terephthalate (BT) as the repeat unit and block copolymer containing polybutylene terephthalate, or the combination thereof. Polybutylene terephthalate homopolymer is preferred.

According to one embodiment of the present invention, the polybutylene terephthalate or the copolymer thereof has an intrinsic viscosity (I.V.) of 0.6 dl/g or more. Preferably, the intrinsic viscosity (I.V.) is in a range of 0.8 to 1.3 dl/g, determined in 50/50 (v/v) of tetrachloroethane/phenol at 25° C.

In this invention, the content of the component A) is 80 to 99.5 wt. %, preferably 84 to 99 wt. %, more preferably 88 to 97 wt. %, based on the weight of polyester matrix powder.

Suitable carbon nanotube in the present invention has a purity of 90% and is milled by means of an ultrahigh-speed powder pulverizer to form a dispersed carbon nanotube powder. According to a preferred embodiment of the present invention, the carbon nanotube powder is milled by means of a powder pulverizer at a speed of 20,000 to 30,000 rpm for 5 to 20 minutes, thereby forming a carbon nanotube powder with a good dispersibility and having a length (L) of less than 3.0 μm (micrometer) and a L/D value of greater than 100. Preferably, the carbon nanotube powder after milling has a length (L) of 0.7 to 3 μm and a L/D value of 100 to 300.

According to an embodiment of the present invention, the carbon nanotube contained in the carbon nanotube powder has an average diameter of 0.5 to 50 nm (nanometer) and an L/D value of 60 to 600.

The content of carbon nanotube powder according to the present invention is 1 to 15 wt. %, preferably 1 to 10 wt. %, more preferably 2.5 to 10 wt. %, and most preferably 3 to 10 wt. %, based on the weight of polyester matrix powder.

The polyester matrix powder of the present invention contains a dispersant as component C). The dispersant exhibits processing stability and functions of improved dispersibility and flowability. During the processing process, the dispersant may produce a free radical that combines the carbon nanotube with the dispersant. Suitable dispersant used in the present invention is an ethylene-acrylic copolymer. According to one preferred embodiment of the present invention, the dispersant is ethylene-acrylic acid copolymer.

The content of the dispersant in the present invention is 0.01 to 6.0 wt. %, preferably 0.1 to 2.0 wt. %, more preferably 0.2 to 1.5 wt. %, based on the weight of polyester matrix powder.

In the present invention, to reinforce the processing ability of the polyester fiber, such as size stability, thermal stability, etc., a chain extender as component D) may be added. The smaller molecular chain segment in the polymer is extended to form longer one by the combination of the unique functional group in the chain extender with the smaller molecular chain segment, i.e. carboxyl group (—COOH), thereby enhancing the properties of the materials, such as intrinsic viscosity (I.V.), thermal stability, size stability, etc. and avoiding the influence of the high-temperature mixing and spinning processes on the physical properties of the materials.

According to the present invention, suitable chain extender is selected from the group consisting of a diisocyanatocycloalkane or an oxazoline. The exemplary compounds are diisocyanatocycloalkane of formula (I),

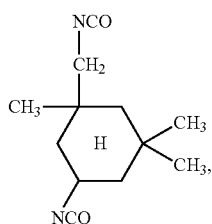

formula (I)

bis-oxazoline of formula (II),

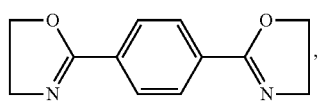

formula (II)

1,4-phenylene-bis-oxazoline,

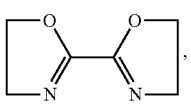

formula (III)

2,2'-methylene bis[(4S)-4-tert-butyl-2-oxazoline] of formula (IV),

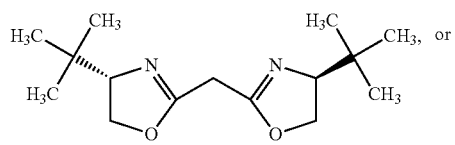

formula (IV)

2,2'-methylene bis[(4S)-4-phenyl-2-oxazoline] of formula (V),

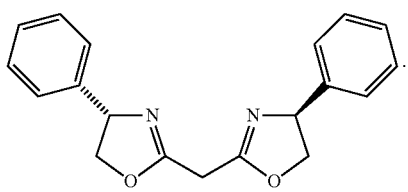

formula (V)

The content of the chain extender in the present invention is 0.01 to 6.0 wt. %, preferably 0.1 to 1.0 wt. %, more preferably 0.1 to 0.8 wt. %, based on the weight of polyester matrix powder.

According to the present invention, A) a polyester polymeric matrix, B) a carbon nanotube powder milled at ultrahigh speed, C) a dispersant and D) a chain extender are mixed by means of a solid dispersing and blending technology. According to one embodiment of the present invention, the carbon nanotube powder is quickly and homogeneously dispersed in the polyester polymeric matrix in a high-speed powder mixer at a speed of 1,000 to 3,000 rpm for 10 to 60 minutes to obtain a polyester matrix powder containing a homogeneously dispersed carbon nanotube powder.

Accordingly, one further object of the present invention is to provide a process for the preparation of a polyester matrix powder containing a homogeneously dispersing carbon nanotube, characterized in that the process comprises the steps of:
1) providing a carbon nanotube with a purity of more than 90% and having a length (L) of less than 2 μM and a L/D value of more than 100,
2) feeding the carbon nanotube into a ultrahigh-speed powder pulverizer at a speed of 20,000 to 30,000 rpm to mill the carbon nanotube for 5 to 20 minutes to form a carbon nanotube powder with good dispersibility,
3) adding the dispersed carbon nanotube powder obtained from step 2) into a polybutylene terephthalate polymeric material and then adding a dispersant and a chain extender to form a polyester matrix mixture,
4) feeding the polyester matrix mixture into a high-speed powder mixer and mixing the mixture at a speed of 1,000 to 3,000 rpm for 10 to 60 minutes to quickly and homogeneously dispersing the carbon nanotube powder in the polyester matrix mixture, thereby forming a polyester matrix powder containing a homogeneously dispersing carbon nanotube.

Suitable carbon nanotube used in the process of the present invention has a purity of more than 90%. The carbon nanotube after milling has a length (L) of less than 3.0 μM and an L/D value of more than 100. According to one embodiment of the process of the present invention, the carbon nanotube after milling has a length (L) of 0.7 to 2.0 μm and an L/D value of 100 to 300. According to a preferred embodiment of the present invention, the carbon nanotube in the carbon nanotube powder has an average diameter of 0.5 to 50 nm and an L/D value of 60 to 600.

In the process of the present invention, suitable polybutylene terephthalate (PBT) polymer matrix is selected from the group consisting of a polybutylene terephthalate or the copolymers thereof. Preferably, the polymer matrix is selected from the group consisting of a polybutylene terephthalate homopolymer, a copolyester containing butylene terephthalate (BT) as the repeat unit and a block copolymer containing polybutylene terephthalate unit, or the combination thereof. The polybutylene terephthalate homopolymer is preferred. According to one preferable embodiment of the present invention, polybutylene terephthalate or the copolymers thereof has an intrinsic viscosity (I.V.) of more than 0.6 dl/g, preferably an intrinsic viscosity (I.V.) of 0.8 to 1.3 dl/g, determined in 50/50 (v/v) of tetrachloroethane/phenol at 25° C.

In the process of the present invention, the dispersant may be the one(s) having an improved processing stability, dispersibility and flowability, such as ethylene-acrylic copolymer. The preferable dispersant is ethylene-acrylic acid copolymer.

In the process of the present invention, the chain extender is selected from the group consisting of a diisocyanatocycloalkane and an oxazoline. As stated above, the exemplary chain extender is diisocyanatocyclohexane of formula (I), bis-oxazoline of formula (II), 1,4-phenylene-bis-oxazoline of formula (III), 2,2'-methylene bis[(4,s)-4-tert-butyl-2-oxazoline] of formula (IV) or 2,2'-methylene bis[(4,s)-4-phenyl-2-oxazoline] of formula (V). Preferably, the chain extender is bis-oxazoline of formula (II), 1,4-phenylene-bis-oxazoline of formula (III), 2,2'-methylene bis[(4,s)-4-tert-butyl-2-oxazoline] of formula (IV) or 2,2'-methylene bis[(4,s)-4-phenyl-2-oxazoline] of formula (V).

The polyester matrix powder obtained by the above process may further be processed and mixed to form electrically conductive masterbatches.

Thus, the further object of the present invention is to provide conductive masterbatches with homogeneous and smooth surfaces, characterized in that the conductive masterbatches are obtained from the polyester matrix powder which is prepared by mixing and granulation via twin-screw mixer according to the process of the present invention, to form conductive masterbatches with homogeneous and smooth surfaces.

According to an embodiment of the present invention, the polyester matrix powder is mixed and granulated by means of twin-screw mixer at a temperature of 220 to 300° C., preferably 230 to 285° C., and at a screw speed of 300 to 400 rpm, preferably 200 to 350 rpm, more preferably 350 rpm.

In the present invention, the obtained conductive masterbatches may pass a filter test, such as 60 μm-screen filter test. According to an embodiment of the present invention, the formed conductive masterbatches have a resistance of less than $10^8$ Ω/sq, preferably $10^0$ to $10^8$ Ω/sq, more preferably $10^0$ to $10^5$ Ω/sq, most preferably $10^1$ to $10^4$ Ω/sq, and very preferably $10^1$ to $10^3$ Ω/sq.

The further one object of the present invention is to provide a process for the preparation of conductive masterbatches with homogeneous and smooth surfaces, wherein the process comprises the steps of:
1) providing a polybutylene terephthalate (PBT) polymeric matrix powder comprising a carbon nanotube powder with good dispersibility, a dispersant and a chain extender, wherein the carbon nanotube is milled in a ultrahigh-speed powder grinder to form a homogeneously dispersed carbon nanotube powder before the addition to the PBT polymer material,
2) feeding the PBT polymeric matrix powder into twin-screw mixer and mixing and granulating the powder at a temperature of 220 to 300° C., preferably 230 to 285° C., and at a screw speed of 300 to 400 rpm, preferably 200 to 350 rpm, more preferably 350 rpm, thereby forming conductive masterbatches with homogeneous and smooth surfaces.

The present invention is further to provide a conductive monofilament prepared from the conductive masterbatches obtained by the process of the present invention via spinning procedure.

The conductive monofilament formed according to the present invention has a diameter of 0.05 to 1.0 mm, preferably 0.1 to 0.5 mm. According to the present invention, the conductive monofilament has a volume specific resistance of $10^4$ Ω·cm or less, preferably $10^3$ Ω·cm or less, and more preferably $10^1$ to $10^3$ Ω·cm. The conductive monofilament formed according to the present invention has a strength of more than 0.8 gf/d, preferably 1.0 to 4.0 gf/d, more preferably 1.0 to 2.0 gf/d. Further, the conductive monofilament formed according to the present invention has an elongation of more than 10%, preferably 10 to 100%, more preferably 10 to 70%.

Further, the present invention provides a process for the preparation of the conductive monofilament, comprising the steps of:
1) providing conductive masterbatches formed from a polybutylene terephthalate (PBT) polymer matrix powder which contains a dispersed carbon nanotube powder, a dispersant and a chain extender, wherein the carbon nanotube powder is homogeneously dispersed in the polymer matrix powder,
2) baking and drying the conductive masterbatches at 110° C. over a time period of 12 hours to obtain dried conductive masterbatches,
3) feeding the dried conductive masterbatches into a single-screw and extruding the masterbatches through a 60 μm-screen filter at a processing temperature of 250 to 285° C. and at a screw speed of 20 rpm, followed by spinning via a spinning nozzle with a pore diameter of 0.5 mm and a length of 1 mm at a single-pore extruding rate of 6 g/minutes to form a filament,
4) cooling the spun filament via a cooling device at a cooling rate of 10 to 30 m/minutes, and then winding the filament at a winding rate of 40 to 100 m/minutes to form a conductive monofilament.

The present invention further provides textiles obtained from the conductive monofilament by processing and shaping procedures, wherein the textiles have a surface resistance of less than $10^5$ Ω/sq, preferably $10^1$ to $10^5$ Ω/sq.

The present invention is characterized in that the carbon nanotube powder is dispersed and the carbon nanotube powder is untangled by means of a ultrahigh-speed, high-strength mechanical force. The advantages of the process according to the present invention is simple, quick, low-cost and free of environmental problems as well as the yield of more than 95% for the carbon nanotube.

According to the present invention, the obtained polyester matrix powder containing homogeneously dispersed carbon nanotube powder is suitable for the preparation of conductive polymer masterbatches with homogeneous and smooth surfaces, of conductive monofilament (such as antistatic or conductive monofilament or multifilament), etc. Further, the conductive monofilament prepared according to the process of the present invention is suitable for the preparation of textiles, such as textiles for filtration, a brush for electronic devices, a running belt, a delivering belt, a packaging material, a clean room or ESD (such as petrochemical industry, aircraft industry, explosive, spraying paint, etc.) or an anti-electromagnetic wave EMI, etc., a dust-proof cloth and an antistatic product (such as antistatic/conductive cloth, anti-electromagnetic cloth, antistatic/conductive groove, antistatic/conductive woven belt, antistatic shoe material, antistatic packaging material, antistatic furniture cloth/carpet, etc.)

In the present invention, the percentage shown in the present description and claims refers to a percentage based on the weight, unless indicated otherwise. The invention is illustrated in greater detail by the examples described below. The examples are not intended in any way to limit the scope of the invention. Notwithstanding that the numerical ranges and parameters setting forth the broad scope are approximations, the numerical values set forth in the specific example are reported as precisely as possible. Any numerical value, however, inherently contains certain errors necessarily resulting from the standard deviation found in its respective testing measurements. The present invention is now to be explained in more detail with the aid of the following examples.

EXAMPLES

A. Types and Characters of Materials
1. Polybutylene terephthalate(PBT) has an intrinsic viscosity (I.V.) of 1.0 dl/g, determined in 50/50 (v/v) of tetrachloroethane/phenol at 25□. Trademark Name: 1100M, available from Changchun Group.
2. Carbon nanotube (CNT) powder, Trademark Name: Nanocyl 7000 available from Nanocyl S.A., Belgian, has an average diameter of 9.5 nm, an average length of 1.5 μm, a length/diameter ratio (L/D) value of 158, a carbon-containing purity of 90% and a specific surface area of 250 to 300 m²/g.
3. Dispersant is, Trademark Name: Wax series A-C 540A available from Honeywell, ethylene-acrylic acid copolymer having a melting point of 105° C.

4. Chain extender is a compound of 2,2'-methylene bis[(4,s)-4-phenylene-2-oxazoline], available from Shanghai Crystalline-Purifying Regent, Ltd.

B. Device Models

1. Ultrahigh-speed, high-strength mechanical device is used for dispersing carbon nanotube, Device Model: Model RT-08 grinder with a speed of 20,000 to 30,000 rpm, available from Mill Powder Tech Solution.

2. High-speed complex powder blending grinder is for homogeneously dispersing carbon nanotube within polymeric material, Device Model: Model FM-20 device having a speed of 1,000 to 3,000 rpm, available from MitsuiMining Co., Ltd. (Japan).

3. Twin-screw mixer/Twin-screw extruder is available from HAAKE (Germany).

4. Polymer melt filter device/Filter screen test device for elevating the distribution of carbon nanotube is a device having a 60 μm of filtering screen, available from HAAKE (Germany).

5. The main device of monofilament spinner is available from HAAKE (Germany), wherein the spinning nozzle has a pore diameter of 0.5 mm, a length of 1 mm, and the upper of the spinning nozzle is equipped with a filtering screen having a diameter of 60 μm for filtering impurities and for enhancing the stability and quality of the spun fiber.

C. The Property Testing of Masterbatches and Fibers

1. Testing for the conductivity of conductive PBT masterbatches

PBT masterbatches are heated and melted, and then pressed to form a square sample with 5 cm×5 cm and a thickness of about 1 mm. The conductivity, i.e. surface resistance ($\Omega$/sq), of the samples is determined by using a 4-pin probe low resistivity meter (Model: MCP-T600, available form Mitsubishi Chemical (Japan)).

2. Testing for the Conductivity of Conductive PBT Monofilament

The conductivity of PBT monofilament is determined by standard method of DIN 54345, wherein the testing distance is 10 cm. The determined resistance is divided by 10 cm to calculate a fiber resistivity ($\Omega$/cm), followed by multiplying the fiber resistivity by the section area of the fiber to yield the volume specific resistance ($\Omega \cdot$cm) of fiber.

3. Testing for the Conductivity of Textiles Prepared from PBT Monofilament

The conductivity of the textiles prepared from PBT monofilament is determined by using the standard method of EN 1149-1: 1996 at a temperature of 23±1° C. and a humidity of 25±5% by means of a surface resistance determining meter.

4. Testing for the Rise of Pressure

The rise of pressure is determined by using a pressure testing device available from HAAKE (Germany) with a 60 μm of filtering screen for the filter testing of conductive masterbatches.

5. Evaluation of Spinnability

The spinning test of the conductive fiber is carried out by using a monofilament spinner available from HAAKE (Germany) at a spinning temperature of 250 to 285° C. and at a screw speed of 20 rpm to evaluate whether the filament breaks.

6. Testing for the Properties of the Tensile Strength, Force and Elongation of the Conductive Monofilament The force, strength and elongation of the conductive monofilament are determined by using a Tensile strength testing machine available from Gotech Testing Machines Inc. (Taiwan) at an ambient temperature of 25° C., a distance of 250 mm between carriers, a tensile speed of 250 mm/minutes.

The Maximum force of breaking the filament refers to the force of monofilament. The strength of the monofilament is obtained from the force of the filament divided by the danier number of the filament. The elongation of monofilament is obtained from the result of the elongation at break divided by the distance of 250 mm.

A. Preparation of Polyester Matrix Powders Containing Dispersed Carbon Nanotubes Comparative Example 1 (C. Ex. 1)

Polybutylene terephthalate(PBT) polymeric matrix is fed into a high-speed composite powder mixer and is mixed at a speed of 2000 rpm over a time period of 30 minutes to obtain a PBT polyester matrix powder as the control.

Comparative Example 2 (C. Ex. 2)

1932 g (96.60%) of polybutylene terephthalate (PBT) polymeric material, 60 g (3.00%) of Nanocyl 7000 carbon nanotube, 4 g (0.20%) of A-C 540A as a dispersant and 4 g (0.20%) of 2,2'-methylene[(4,s)-4-phenyl-2-oxazoline] are mixed to obtain PBT polyester matrix powder as a control containing carbon nanotube powder, where the Nanocyl 7000 carbon nanotube in this comparative example is dispersed and mixed without using a ultrahigh-speed, highly strong force and without using a high-speed, highly strong mechanical force.

Comparative Example 3 (C. Ex. 3)

Analogously to Comparative Example 2, 1870 g (93.50%) of polybutylene terephthalate (PBT) polymeric material, 120 g (6.00%) of Nanocyl 7000 carbon nanotube, 6 g (0.30%) of A-C 540A dispersant and 4 g (0.20%) of 2,2'-methylene[(4,s)-4-phenyl-2-oxazoline] are mixed to obtain PBT polyester matrix powder containing carbon nanotube powder.

Comparative Example 4 (C. Ex. 4)

1870 g (93.50%) of polybutylene terephthalate(PBT) polymeric material, 120 g (6.00%) of Nanocyl 7000 carbon nanotube, 6 g (0.30%) of A-C 540A dispersant and 4 g (0.20%) of 2,2'-methylene[(4,s)-4-phenyl-2-oxazoline] are mixed. The obtained PBT polymeric matrix mixture is fed into a high-speed compounding powder mixer and mixed at a speed of 2000 rpm for 30 minutes to obtain PBT polyester matrix powder containing carbon nanotube powder. The Nanocyl 7000 carbon nanotube in this comparative Example was dispersed without using ultrahigh-speed, highly strong mechanical force.

Comparative Example 5 (C. Ex. 5)

Nanocyl 7000 carbon nanotube is fed into an ultrahigh-speed powder grinder and milled at a speed of 30000 rpm for 5 minutes to form a carbon nanotube powder with good dispersibility.

120 g (6.00%) of the carbon nanotube powder and 6 g (0.30%) of A-C 540A dispersant are added to 1874 g (93.70%) of polybutylene terephthalate (PBT) polymeric matrix and mixed to obtain a PBT polyester mixture. Then, the polyester mixture is fed into a high-speed composite powder mixer and mixed at a speed of 2000 rpm for 30 minutes in order to quickly and homogeneously dispersing the Nanocyl 7000 carbon nanotube powder in the PBT polyester matrix, thereby obtaining PBT polyester matrix powder containing homogeneously dispersed carbon nanotube powder. In this Comparative Example, the polyester matrix powder contains no chain extenders.

Example 1 (Ex. 1)

Nanocyl 7000 carbon nanotube is fed into an ultrahigh-speed powder grinder and milled at a speed of 30000 rpm for 5 minutes to form a carbon nanotube powder with good dispersibility.

20 g (1.00%) of the carbon nanotube powder, 2 g (0.10%) of A-C 540A dispersant and 2 g (0.10%) of 2,2'-methylene [(4,s)-4-phenyl-2-oxazoline] are added to 1976 g (98.80%) of polybutylene terephthalate (PBT) polymeric matrix and mixed to obtain a PBT polyester mixture. Then, the polyester mixture is fed into a high-speed composite powder mixer and mixed at a speed of 2000 rpm for 30 minutes in order to quickly and homogeneously dispersing Nanocyl 7000 carbon nanotube powder in PBT polyester matrix, thereby obtaining a PBT polyester matrix powder containing homogeneously dispersed carbon nanotube powder.

Examples 2 to 6 (Ex. 2 to Ex. 6)

Analogously to Example 1, the PBT polyester matrix powder of Examples 2 to 6 containing homogeneously dispersed carbon nanotube powder are prepared according to the composition ratios shown on table 1.

TABLE 1

| | | CNT (Nanocyl 7000) | | | |
|---|---|---|---|---|---|
| | PBT, g (wt. %) | Dispersing without high-speed, highly strong mechanic force, g (wt. %) | Dispersing with high-speed, highly strong mechanic force, g (wt. %) | Dispersant A-C540A, g (wt. %) | Chain extender, g (wt. %) |
| Controls | | | | | |
| C. Ex. 1 | 2000 (100%) | — | — | — | — |
| C. Ex. 2 | 1932 (96.60%) | 60 (3.00%) | — | 4 (0.20%) | 4 (0.20%) |
| C. Ex. 3 | 1870 (93.50%) | 120 (6.00%) | — | 6 (0.30%) | 4 (0.20%) |
| C. Ex. 4 | 1870 (93.50%) | 120 (6.00%) | — | 6 (0.30%) | 4 (0.20%) |
| C. Ex. 5 | 1874 (93.70%) | — | 120 (6.00%) | 6 (0.30%) | — |
| According to the present invention | | | | | |
| Ex. 1 | 1976 (98.80%) | — | 20 (1.00%) | 2 (0.10%) | 2 (0.10%) |
| Ex. 2 | 1932 (96.60%) | — | 60 (3.00%) | 4 (0.20%) | 4 (0.20%) |
| Ex. 3 | 1970 (93.50%) | — | 120 (6.00%) | 6 (0.30%) | 4 (0.20%) |
| Ex. 4 | 1968 (93.40%) | — | 120 (6.00%) | 8 (0.40%) | 4 (0.20%) |
| Ex. 5 | 1824 (91.20%) | — | 160 (8.00%) | 12 (0.60%) | 4 (0.20%) |
| Ex. 6 | 1775 (88.75%) | — | 200 (10.00%) | 20 (1.00%) | 5 (0.25%) |

B. Preparation and Property Testing for Conductive Masterbatches

Each of PBT polymeric matrix powders prepared by Comparative Example 1 to 5 and Examples 1 to 6 is fed into a twin-screw mixer and then mixed and granulated at a temperature of 230 to 300° C. and a screw speed of 350 rpm to prepare conductive masterbatches.

The masterbatches obtained from Comparative Example 1 to 5 and Example 1 to 6 respectively refer to as sample Nos.: C-PBT, PCN3-0, PCN6-1, PCN6-2, PCN6-3, PCN1-1, PCN3-1, PCN6-4, PCN6-5, PCN8-5 and PCN10-1, and the dispersibility of the carbon nanotube are evaluated by using a filter screen testing machine, available from HAAKE (Germany), with a 60 μm screen. Dispersibility is evaluated by the determination of the pressure rise in the filter test and the result is shown on table 2.

TABLE 2

| Sample Nos. | PBT matrix powder | CNT (Nanocyl 7000) | | Dispersing PBT + CNT + dispersant + chain extender with high-speed, highly strong mechanic force (high-speed compounding powdermixer) | Surface resistance (Ω/sq) | The distribution of CNT in polymeric matrix | |
|---|---|---|---|---|---|---|---|
| | | Dispersing without ultrahigh-speed, highly strong mechanic force (wt. %) | Dispersing with ultrahigh-speed, highly strong mechanic force (wt. %) | | | change of preessure rise (ΔPa/min) | Evaliation of spinning ability |
| C-PBT | C. Ex. 1 | 0% | — | — | >$10^{13}$ | <2 Pa/20 min | — |
| PCN3-0 | C. Ex. 2 | 3.00% | — | w/o | $2 \times 10^4$ | >90 Pa/8 min | Very poor |
| PCN6-1 | C. Ex. 3 | 6.00% | — | w/o | $4 \times 10^2$ | >150 Pa/9 min | Very poor |
| PCN6-2 | C. Ex. 4 | 6.00% | — | w | $3 \times 10^2$ | >50 Pa/10 min | Very poor |
| PCN6-3 | C. Ex. 5 | — | 6.00% | w | | difficult to granulate | |
| PCN1-1 | Ex. 1 | — | 1.00% | w | $1 \times 10^8$ | <2 Pa/20 min | excellent |
| PCN3-1 | Ex. 2 | — | 3.00% | w | $8 \times 10^3$ | <10 Pa/70 min | good |
| PCN6-4 | Ex. 3 | — | 6.00% | w | $2 \times 10^2$ | <10 Pa/50 min | good |
| PCN6-5 | Ex. 4 | — | 6.00% | w | $1 \times 10^2$ | <5 Pa/100 min | good |
| PCN8-5 | Ex. 5 | — | 8.00% | w | $6 \times 10^1$ | <10 Pa/90 min | good |
| PCN10-1 | Ex. 6 | — | 10.00% | w | 7 | <10 Pa/50 min | good |

In overall, the lower the rise pressure is, the better the distribution of the carbon nanotube in PBT polyester matrix is. As shown on the result of table 2, the conductive masterbatches (such as PCN3-0 and PCN6-1) formed from polyester matrix powder which contains carbon nanotube which is dispersed without using a high-speed, highly strong mechanic force has a higher pressure rise and exhibits poor spinning ability. The conductive masterbatches (PCN6-2) formed from PBT polyester matrix powder dispersed with a high-speed, highly strong mechanic force and then granulated has a lower pressure rise but poor spinning ability. Further, if the PBT matrix powder contains no chain extenders, the conductive masterbatches (such as PCN6-3) formed therefrom are difficult to granulate or cannot be granulated.

In contrast, according to the present invention, the conductive masterbatches (such as PCN3-1, PCN6-4, PCN6-5, PCN8-5 and PCN10-1) formed from the PBT polyester matrix powder which contains a homogeneously dispersed carbon nanotube, a dispersant and a chain extender have lower pressure rise and exhibit better spinning ability.

The conductive resistance is tested for the conductive masterbatches formed from the PBT matrix powders which are prepared by the above Examples and Comparative Examples and the results are shown on table 2.

As shown on table 2, the surface resistance of the conductive masterbatches according to the present invention, which is formed from the PBT polyester matrix powder containing a homogeneously dispersed carbon nanotube, a dispersant and a chain extender, are decreased as the content of the carbon nanotube is increased. Namely, it appears that the conductivity of the conductive masterbatches is increased as the content of the carbon nanotube is increased. On the other side, as compared with the masterbatches (C-PBT) prepared from a pure PBT polyester matrix powder, the conductive masterbatches (such as PCN3-1, PCN6-4, PCN6-5, PCN8-5 and PCN10-1) formed from the PBT polyester powder according to the present invention have a significantly increased conductivity. In addition, as compared with the conductive masterbatches prepared from the PBT matrix powder containing the same amount of carbon nanotube dispersed without the use of a high-speed, highly mechanical force (such as PCN6-1, PCN6-2) or from the PBT matrix powder containing no chain extenders (such as PCN6-3), the conductive masterbatches (such as PCN6-4, PCN6-5) according to the present invention exhibit better conductivity and lower surface resistance.

C. Preparation and Property Test of the Conductive PBT Monofilament

The conductive masterbatches, C-PBT, PCN1-1, PCN3-1, PCN6-4, PCN6-5, PCN8-5 and PCN10-1, are baked and dried at a temperature of 1100 over a period of 12 hours to obtain dried conductive masterbatches. The dried conductive masterbatches are fed into a single-screw extruder, and are extruded at a processing temperature of 250 to 285° C. and at a screw speed of 20 rpm through a 60 μm of filtering screen and then are spun through a spinning nozzle with a pore diameter of 0.5 mm and a length of 1 mm at a single pore extruding output of 6 g/minutes. After that, the spun filaments are cooled by a cooling device at a cooling speed of 5 to 30 m/minutes and then winded at a winding speed of 40 to 100 m/minutes. After the cooling and crimping procedures, the conductive monofilaments (Nos.: F-PBT, F-PCN1-1, F-PCN3-1, F-PCN6-4, F-PCN6-5, F-PCN8-5 and F-PCN10-1) are formed.

The conductivity, tension, strength and elongation of the thus-prepared conductive monofilaments are determined and the result is shown on table 3.

TABLE 3

| Sample Nos. | Conductive masterbatches Nos. | PBT matrix powder | Content of carbon nanotube, wt. % | Fiber diameter (mm) | Denier (D) | Volume specific resistance of fiber ($\Omega \cdot cm$) | Surface resistance ($\Omega$/sq) | Tension (Kg) | Strength (gf/d) | elongation (%) |
|---|---|---|---|---|---|---|---|---|---|---|
| F-PBT | C-PBT | C. Ex. 1 | 0 | 0.27 | 698 | — | — | 1.47 | 2.1 | 100 |
| F-PCN1-1 | PCN1-1 | Ex. 1 | 1 | 0.25 | 600 | — | $10^9$ | 0.83 | 1.4 | 80 |
| F-PCN3-1 | PCN3-1 | Ex. 2 | 3 | 0.24 | 552 | $3.3 \times 10^3$ | $10^5$ | 0.73 | 1.3 | 60 |
| F-PCN6-4 | PCN6-4 | Ex. 3 | 6 | 0.26 | 648 | $1.6 \times 10^2$ | $10^{3-4}$ | 0.753 | 1.1 | 35 |
| F-PCN6-5 | PCN6-5 | Ex. 4 | 6 | 0.28 | 751 | $3.6 \times 10^2$ | $10^{3-4}$ | 0.8 | 1.1 | 37 |
| F-PCN8-5 | PCN8-5 | Ex. 5 | 8 | 0.205 | 403 | 26 | $10^3$ | 0.562 | 1.3 | 18 |
| F-PCN10-1 | PCN10-1 | Ex. 6 | 10 | 0.205 | 403 | 12 | $10^{2-3}$ | 0.58 | 1.44 | 19 |

As shown on table 3, the conductive monofilaments prepared from conductive masterbatches formed by polybutylene terephthalate polymeric matrix powders which respectively contain 3%, 6%, 8% and 10% of dispersed carbon nanotube powders have a better conductivity in a range of up to $10^2$ to $10^5$ $\Omega$/sq. As compared with the monofilament (F-PBT) prepared from a pure polybutylene terephthalate masterbatches, the monofilaments prepared from the conductive masterbatches according to the present invention have better tension and stable strength.

While the embodiments of the present invention described herein are presently preferred, various modifications and improvements can be made without departing from the spirit and scope of the present invention. The scope of the present invention is indicated by the appended claims, and all changes that fall within the meaning and range of equivalents are intended to be embraced therein.

What is claimed is:

1. A polyester matrix powder containing a homogeneously dispersed carbon nanotube powder, comprising:
    A) 80 to 99.5 wt. % of a polyester polymeric matrix based on a polybutylene terephthalate (PBT) or the copolymer thereof, based on the weight of polyester matrix powder,
    B) 1 to 15 wt. % of a carbon nanotube powder milled at ultrahigh speed, based on the weight of polyester matrix powder,
    C) 0.01 to 6.0 wt. % of a dispersant, based on the weight of polyester matrix powder,
    D) 0.01 to 6.0 wt. % of a chain extender, based on the weight of polyester matrix powder;
    wherein components A), B), C) and D) are mixed by means of a high-speed powder mixer to obtain a polyester matrix powder;
    wherein the chain extender is selected from the group consisting of a diisocyanatocycloalkane and an oxazoline;

wherein the oxazoline is selected from the group consisting of a diisocyanatocyclohexane, a bis-oxazoline, 1,4-phenylene bis-oxazoline, 2,2'-methylene[(4,s)-4-tert-butyle-2-oxazoline] and 2,2'-methylene[(4,s)-4-phenyl-2-oxazoline].

2. The polyester matrix powder according to claim 1, wherein the polybutylene terephthalate or the copolymer thereof in component A) is selected from the group consisting of a polybutylene terephthalate homopolymer, a copolyester having a repeat unit of butylene terephthalate (BT) and a block copolymer having a unit of polybutylene terephthalate, and the combination thereof.

3. The polyester matrix powder according to claim 2, wherein the polyester polymeric matrix is based on a polybutylene terephthalate homopolymer.

4. The polyester matrix powder according to claim 1, wherein the polybutylene terephthalate or the copolymer thereof has an intrinsic viscosity (I.V.) of more than 0.6 dl/g.

5. The polyester matrix powder according to claim 4, wherein the polybutylene terephthalate or the copolymer thereof has an intrinsic viscosity (I.V.) in a range of 0.6 to 1.3 dl/g.

6. The polyester matrix powder according to claim 5, wherein the polybutylene terephthalate or the copolymer thereof has an intrinsic viscosity (I.V.) in a range of 0.8 to 1.3 dl/g.

7. The polyester matrix powder according to claim 1, wherein the polyester polymeric matrix is in an amount of 84 to 99 wt. %, based on the weight of polyester matrix powder.

8. The polyester matrix powder according to claim 7, wherein the polyester polymeric matrix is in an amount of 88 to 97 wt. %, based on the weight of polyester matrix powder.

9. The polyester matrix powder according to claim 1, wherein the carbon nanotube powder prepared via ultrahigh-speed milling has a length (L) of less than 3.0 µm and an L/D value of more than 100.

10. The polyester matrix powder according to claim 1, wherein the milled carbon nanotube powder has a length (L) of 0.7 to 3.0 µm and an L/D value of 100 to 300.

11. The polyester matrix powder according to claim 1, wherein the milled carbon nanotube powder is formed from a carbon nanotube with an average tube diameter of 0.5 to 50 nm (nanometer) or with an L/D value of 60 to 600.

12. The polyester matrix powder according to claim 1, wherein component B) is in amount of 1 to 10 wt. %, based on the weight of polyester matrix powder.

13. The polyester matrix powder according to claim 12, wherein component B) is in an amount of 2.5 to 10 wt. %, based on the weight of polyester matrix powder.

14. The polyester matrix powder according to claim 13, wherein component B) is in an amount of 3 to 10 wt. %, based on the weight of polyester matrix powder.

15. The polyester matrix powder according to claim 1, wherein the dispersant is an ethylene-acrylic copolymer.

16. The polyester matrix powder according to claim 15, wherein the dispersant is ethylene-acrylic acid copolymer.

17. The polyester matrix powder according to claim 1, wherein the dispersant is in an amount of 0.1 to 2.0 wt. %, based on the weight of polyester matrix powder.

18. The polyester matrix powder according to claim 17, wherein the dispersant is in an amount of 0.2 to 1.5 wt. %, based on the weight of polyester matrix powder.

19. The polyester matrix powder according to claim 1, wherein the oxazoline is 2,2'-methylene[(4,s)-4-tert-butyle-2-oxazoline] or 2,2'-methylene[(4,s)-4-phenyl-2-oxazoline].

20. The polyester matrix powder according to claim 1, wherein the chain extender is in an amount of 0.1 to 1.0 wt. %, based on the weight of polyester matrix powder.

21. The polyester matrix powder according to claim 20, wherein the chain extender is in an amount of 0.1 to 0.8 wt. %, based on the weight of polyester matrix powder.

22. Conductive masterbatches, which are prepared from the polyester matrix powder according to claim 1.

23. The conductive masterbatches according to claim 22, wherein the resistance of conductive masterbatches is in a range of $10^0$ to $10^8$ Ω/sq.

24. The conductive masterbatches according to claim 23, wherein the resistance of conductive masterbatches is in a range of $10^0$ to $10^5$ Ω/sq.

25. A conductive monofilament, which is formed from the conductive masterbatches according to claim 22.

26. The conductive monofilament according to claim 25, wherein the fiber diameter of the conductive monofilament is in a range of 0.05 to 1.0 mm.

27. The conductive monofilament according to claim 26, wherein the fiber diameter of the conductive monofilament is in a range of 0.1 to 0.5 mm.

28. The conductive monofilament according to claim 25, wherein the conductive monofilament has a volume resistance in a range of $10^4$ Ω·cm or less, a strength of 0.8 gf/d or more and an elongation of 10% or more.

29. The conductive monofilament according to claim 28, wherein the conductive monofilament has a volume resistance in a range of $10^1$ to $10^3$ Ω·cm, a strength of 1.0 to 4.0 gf/d and an elongation of 10 to 70%.

30. Textiles comprising the monofilament according to claim 25.

31. The textiles according to claim 30, wherein the textiles have a surface resistance of less than $10^5$ Ω/sq.

32. The textiles according to claim 31, wherein the textiles have a surface resistance of $10^1$ to $10^5$ Ω/sq.

33. A process for the preparation of a conductive monofilament comprising the steps:
1) providing conductive masterbatches,
2) placing the conductive masterbatches at a temperature of 110 °C. and baking over a period of 6 to 30 hours to obtain dried conductive masterbatches,
3) feeding the dried conductive masterbatches into a single screw extruder and extruding at a processing temperature of 250 to 285° C. and at a screw speed of 20 rpm, and then extruding through a filter with 60 µm screen, followed by spinning via a spinning nozzle with a pore diameter of 0 5 mm and a length of 1 mm to obtain a spun filament,
4) cooling the spun filament from step (3) at a cooling rate of 5 to 30 m/min through a cooling device and then winding at a winding rate of 40 to 100 m/min to form a conductive monofilament;
wherein the conductive masterbatches are prepared from a polyester matrix powder containing a homogeneously dispersed carbon nanotube powder, comprising:
A) 80 to 99.5 wt. % of a polyester polymeric matrix based on a polybutylene terephthalate (PBT) or the copolymer thereof, based on the weight of polyester matrix powder,
B) 1 to 15 wt. % of a carbon nanotube powder milled at ultrahigh speed, based on the weight of polyester matrix powder,
C) 0.01 to 6.0 wt. % of a dispersant, based on the weight of polyester matrix powder,
D) 0.01 to 6.0 wt. % of a chain extender, based on the weight of polyester matrix powder, wherein components A), B), C) and D) are mixed by means of a high-speed powder mixer to obtain a polyester matrix powder.

\* \* \* \* \*